United States Patent [19]

Roman

[11] Patent Number: 5,529,330
[45] Date of Patent: Jun. 25, 1996

[54] HITCH HELPER

[76] Inventor: Rick Roman, 4327 E. Edgewood Ave., Mesa, Ariz. 85206

[21] Appl. No.: 376,836

[22] Filed: Jan. 23, 1995

[51] Int. Cl.⁶ ..................................................... B60D 1/36
[52] U.S. Cl. .......................................... 280/477; 280/511
[58] Field of Search ................................... 280/477, 504, 280/511, 507, 478.1

[56] References Cited

U.S. PATENT DOCUMENTS

| | | | |
|---|---|---|---|
| 3,765,703 | 10/1973 | Voelkerding et al. | 280/475 X |
| 4,871,184 | 10/1989 | Johnson | 280/477 |
| 4,871,185 | 10/1989 | Chakroff et al. | 280/511 X |
| 5,236,215 | 8/1993 | Wylie | 280/477 |
| 5,330,196 | 7/1994 | Ricles | 280/477 |

*Primary Examiner*—Margaret A. Focarino
*Assistant Examiner*—Victor E. Johnson

[57] ABSTRACT

This discloses a two part assembly that allows one person from a vehicle to align a trailer onto any size hitch ball on a bumper or a receiver hitch in only one attempt. The first part of the two part assembly, the horizontal steel plate is attached to the bumper by its hitch ball. A similar horizontal steel plate is attached to a receiver hitch by its hitch ball also. The second part of the assembly, the V shaped guide, acts as the guide for the trailer tongue to be guided onto the hitch ball. The V shaped guide fits into the horizontal steel plate by its male dowels which are inserted into the female dowels of the horizontal steel plate. This extended V shaped guide will assist the towing vehicle in backing up to a trailer at any angle, allowing the trailer tongue to be guided onto the hitch ball of a bumper or receiver hitch that has a horizontal steel plate attached. The V shaped guide is then removed after the hitch ball has been locked into place. Both pieces of this two part assembly are easy to attach and remove, requiring no special tools or welding.

1 Claim, 4 Drawing Sheets

HITCH HELPER

BACKGROUND OF THE INVENTION

When attempting to hitch a trailer onto a towing vehicle, proper alignment of the trailer tongue and towing vehicle's hitch ball is required. Due to the driver's inability to view the alignment of the trailer tongue and hitch ball, several attempts or a second person's assistance are often required before a successful coupling is accomplished. Overcoming this problem requires a device that enables one person to guide the trailer tongue directly onto the hitch ball of the towing vehicle.

Prior inventions have attempted to address this burdensome process, however, some of the inventions require the owner to permanently mount their devices onto your vehicle by welding, therefore restricting the range of lateral movement between the towing vehicle and trailer. Others attempt to solve this problem for vehicles with a receiver hitch, not vehicles with a bumper and hitch ball. Some of these inventions even use a v shaped guide, but fail to use the v shaped guide to its full potential.

Miller U.S. Pat. No. 3,879,062, attempts to help remove the stress caused by the v shaped guide on a vehicle as described in Eichels et al U.S. Pat. No. 3,773,356. Miller's design helped alleviate the stress caused by other v shaped guides, but it resulted in a complicated device requiring numerous pins, chains, screws, and bolts.

Chakroff et al U.S. Pat. No. 4,871,185, made another attempt using a v shaped guide for a receiver hitch. This design improves earlier v shaped guides by having an adjustable guide wall means, mounted to the interior surface of the v shaped guide. However, only the guide walls are removable, the rest of the v shaped guide is permanently welded to the vehicle. Another problem with this device, is that the trailer tongue can only can be guided above the hitch ball, not onto the hitch ball itself.

Baskett U.S. Pat. No. 4,840,392, makes an attempt to improve receiver hitches also. Its v shaped fence attempts to do the same job as a larger v shaped guide, however, the small size and shape of this fence limits its use. In addition, this assembly requires a specific measurement prior to fastening the hitch ball to the base in order to provide sufficient clearance for the trailer tongue.

Johnson U.S. Pat. No. 4,871,184, attempts to simplify previous patents by the use of a two part assembly. Unfortunately, the base piece remains on the bumper or trailer tongue when driving. This device also sits high on the receiver hitch and may block the view of the license plate of the vehicle when a trailer is not in use. The box shaped design requires a precise alignment of the trailer hitch and towing vehicle prior to its ability to serve as a guide. In general, to obtain the maximum benefit of this assembly, the width of the guide should be increased.

SUMMARY OF THE INVENTION

This assembly has been designed to allow one person to easily align a trailer tongue directly onto the hitch ball of a bumper or receiver hitch. The Hitch Helper consists of only two parts, the horizontal steel plate and the V shaped guide.

The horizontal steel plate is made of ¼ inch steel. There are four steel hollow female dowels welded vertically onto the plate by the manufacturer. The female dowels measure ½ inch by 2 inches. All four female dowels are spaced evenly apart. These dowels are aligned with four male dowels on the V shaped guide. A ¾ inch hole, allowing for any size hitch ball, has been drilled into the plate. To mount and secure the horizontal steel plate onto a bumper, simply thread the bumper's hitch ball through the horizontal steel plate and tighten its nut as vehicle manufacturer specifies. The design of the horizontal steel plate will not block the view of the vehicles license plate. A similar horizontal steel plate is used with a receiver hitch. It is mounted and removed in the same manner as described for a hitch ball on a bumper. The horizontal steel plate has been designed to remain in place as long a desired. This plate can be easily removed at any time. No welding or special tools are required to mount or remove the horizontal steel plate onto a bumper or receiver hitch.

The V shaped guide is made from ¼ inch steel and measures 3 inches by 33 inches. There are four solid steel male dowels facing downwards at a 90 degree angle, welded onto the V shaped guide by the manufacturer. The male dowels measure ½ inch by 2 inches. All four male dowels are spaced evenly apart and align with the four female dowels on the horizontal steel plate. The spacing in-between the male dowels has been designed to assist in absorbing the impact of the trailer tongue. The height of the V shaped guide has been designed to help alleviate damage caused to the vehicle's bumper and license plate.

The Hitch Helper's design simplifies the hitching process by allowing a successful hook up in one attempt. After the assembly has been set into place, the trailer tongue will be guided directly onto the hitch ball as soon as it connects with any part of the 33 inch V shaped guide. The driver will either "feel" the impact or see the trailer move slightly. The driver will then know the trailer tongue is on the hitch ball of the bumper or receiver hitch. The driver will get out of the vehicle and lock the trailer onto the hitch ball. The V shaped guide removes by simply lifting it off the horizontal steel plate with your hands. It can then be stored until it is needed for the assistance of hooking up a trailer again. The V shaped guide always must be removed after each use.

Another important feature of the Hitch Helper is the design and length of the V shaped guide. The Hitch Helper enables a driver to back a vehicle up to a trailer at any angle and successfully hitch up to the trailer in one attempt.

DETAILED DESCRIPTION OF THE PREFERRED EMBODIMENT

The present invention is a guide assembly indicated in FIG 1A thru 6A, which has been designed to assist in hitching a trailer onto a vehicle's bumper 31 or receiver hitch 32 use with any size hitch ball 10.

Figure 1A:
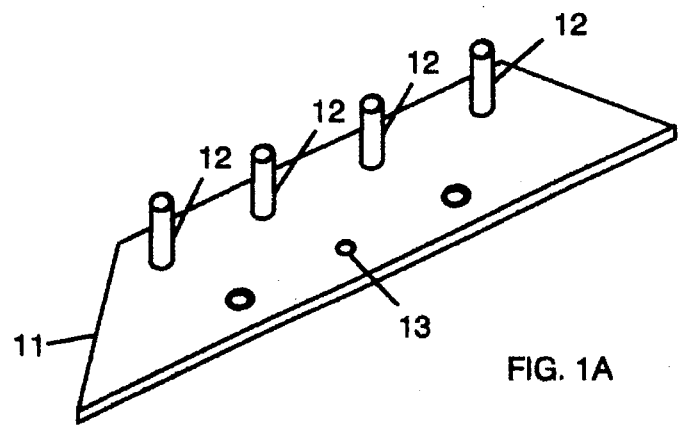
FIG. 1A shows an angled view of the horizontal steel plate which attaches onto a bumper.

FIG. 1A shows a guide assembly that consists of a horizontal ¼ inch steel plate 11 used with any size hitch ball 10 on a bumper 31 of a vehicle. The horizontal steel plate 11 has four evenly spaced steel female dowels 12, which measure ½ inch by two inches in height. The female dowels 12 have been welded vertically onto the back of the horizontal steel plate 11 by the manufacturer. Three ¾ inch holes 13 evenly spaced have been drilled into the horizontal steel plate 11 to accommodate the use of any size hitch ball 10. When towing a trailer the center hole 13 is used. The other two holes 13 can be used for the storage of any extra hitch ball 10.

To attach the horizontal steel plate 11 onto a vehicle's bumper 31, you would set the plate 11 onto the back of the bumper 31 with the four female dowels 12 facing upwards. The hitch ball 10 is then threaded by its shank 9 through the ¾ inch center hole 13 of the plate 11, and through the existing hole on the bumper 31. You then tighten the hitch ball 10 by its nut 8, as the vehicle manufacture suggests. The horizontal steel plate 11 is now secured on the bumper 31 by the hitch ball 10, and remains in place as long as desired. No welding or special tools are required for assembly.

Figure 2A:
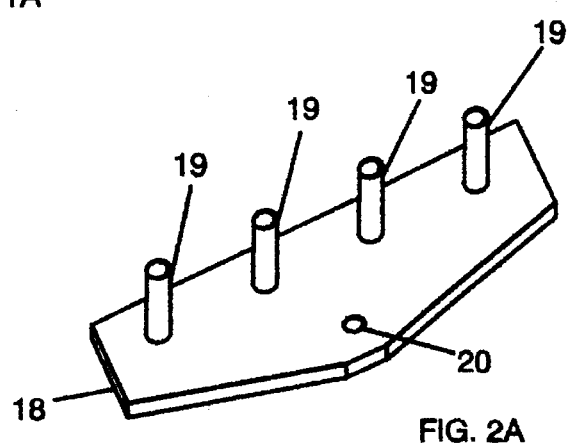
FIG. 2A shows an angled view of the horizontal steel plate which attaches onto a receiver hitch.

FIG. 2A shows a guide assembly that consists of a horizontal ¼ inch steel plate 18 used with any size hitch ball 10 for a vehicle's receiver hitch 32. The horizontal ¼ inch steel plate 18, has four evenly spaced steel female dowels 19 which measure ½ inch by two inches in height and face upwards. The female dowels 19 have been welded vertically onto the back of the horizontal steel plate 18 by the manufacturer. A ¾ inch hole 20 has been drilled into the horizontal steel plate 18. It will accommodate the use of any size hitch ball 10 for towing a trailer.

To attach the horizontal steel plate 18 onto a vehicle's receiver hitch 32, you would set the plate 18 onto the back of the receiver hitch 32 with the four female dowels 19 facing upwards. The hitch ball 10 is then threaded by its shank 9 through the hole 20 of the plate 18, and through the existing hole on the receiver hitch 32. You would then tighten the hitch ball 10 by its nut 8, as the vehicle manufacturer suggests. The horizontal steel plate 18 is now secured by the hitch ball 10, and remains in place as long as desired. No welding or special tools are required for assembly.

Figure 3A:
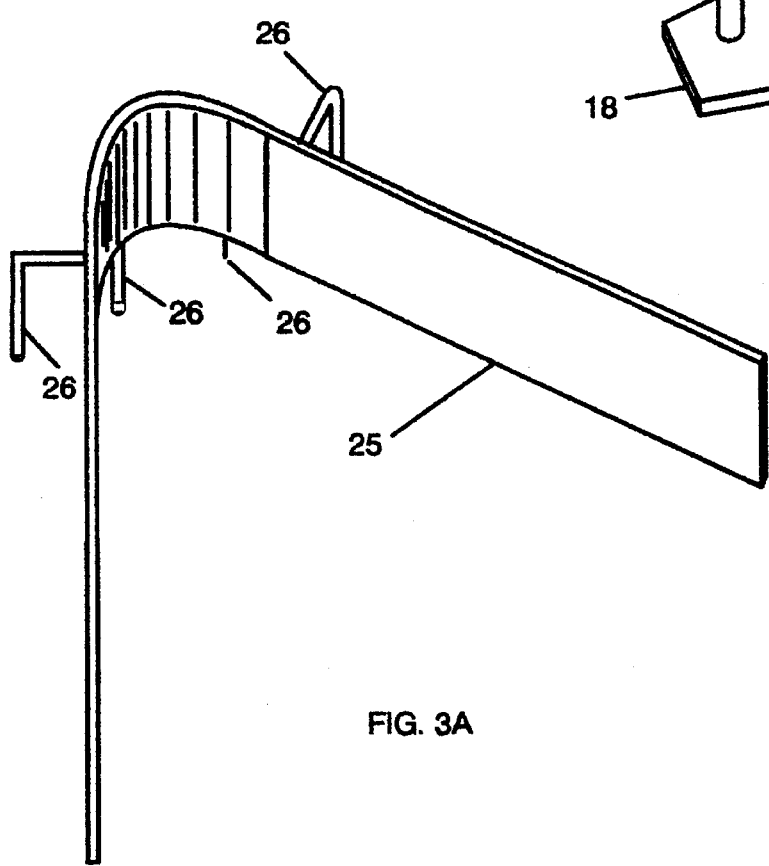
FIG. 3A shows an angled view of the V shaped guide which attaches into FIG. 1A or FIG 2A.

FIG. 3A shows a steel V shaped guide 25 used with the horizontal steel plate 11 and 18. The V shaped guide 25 is made from ¼ inch steel and measures 3 inches by 33 inches. Four 90 degree solid steel male dowels 26 have been welded on the outside of the V shaped guide 25 by the manufacturer. The four solid steel male dowels 26, measure ½ inch by 2 inches. The male dowels 26 are spaced evenly apart and face downwards, to accommodate the female dowels 12 19 on the horizontal steel plate 11 and 18.

Figure 4A:
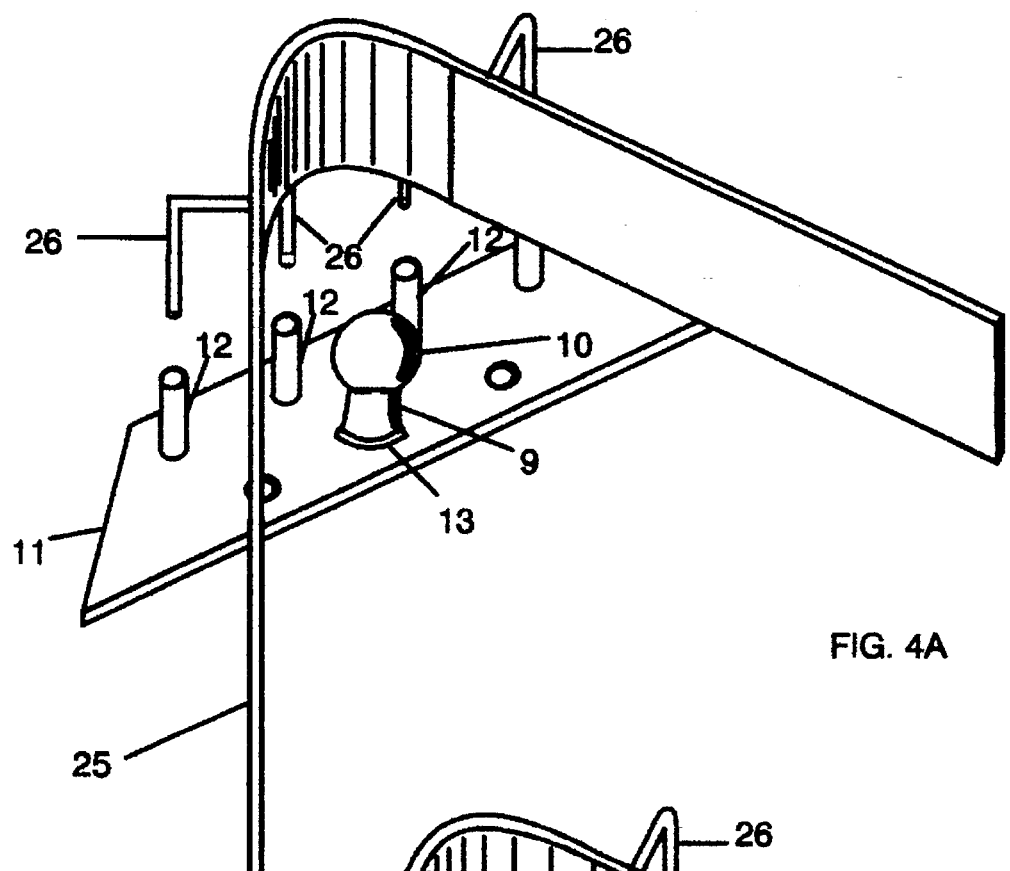
FIG. 4A shows an angled view of how to place FIG. 3A into FIG. 1A. NOTE: the hitch ball is shown in correct position for towing.

FIG. 4A shows how to assemble the V shaped guide 25 onto the horizontal steel plate 11 for a vehicle with a bumper 31, and where the hitch ball 10 would be in correct position.

Figure 4B:
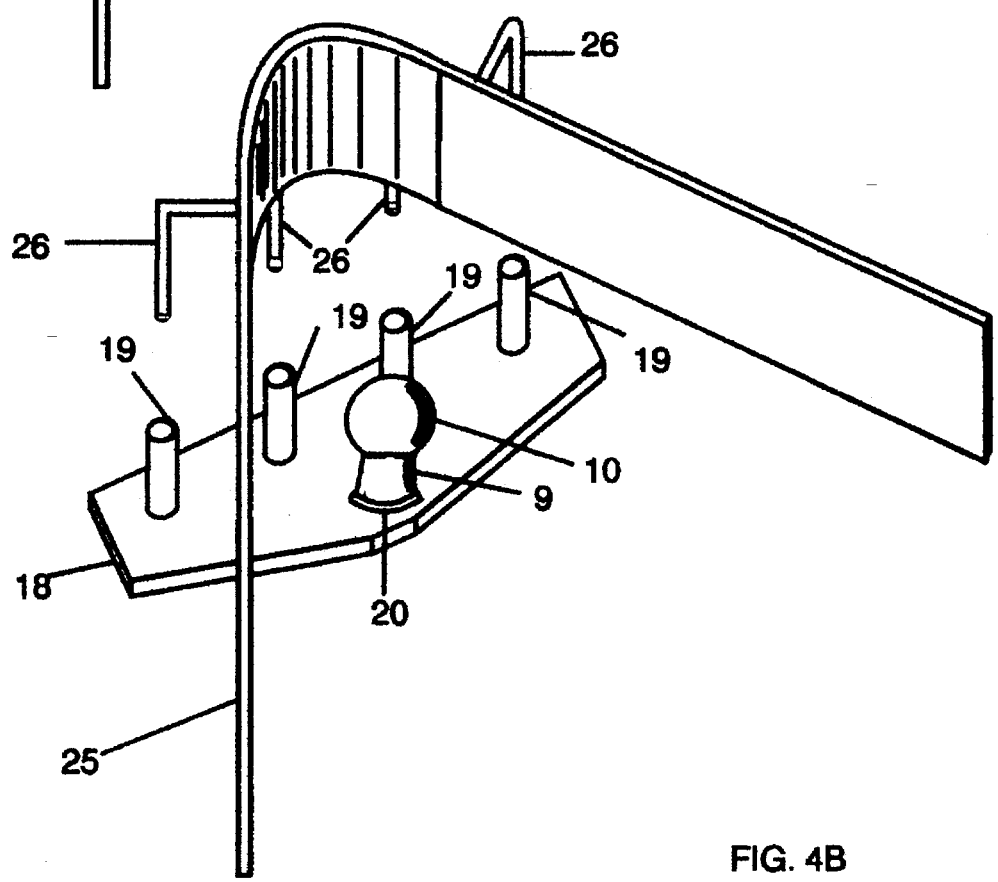
FIG. 4B shows an angled view of how to place FIG. 3A into FIG. 2A. NOTE: the hitch ball is shown in correct position for towing.

FIG. 4B shows how to assemble the V shaped guide 25 onto the horizontal steel plate 18 for a vehicle with a receiver hitch 32, and where the hitch ball 10 would be in correct position.

Figure 5A:
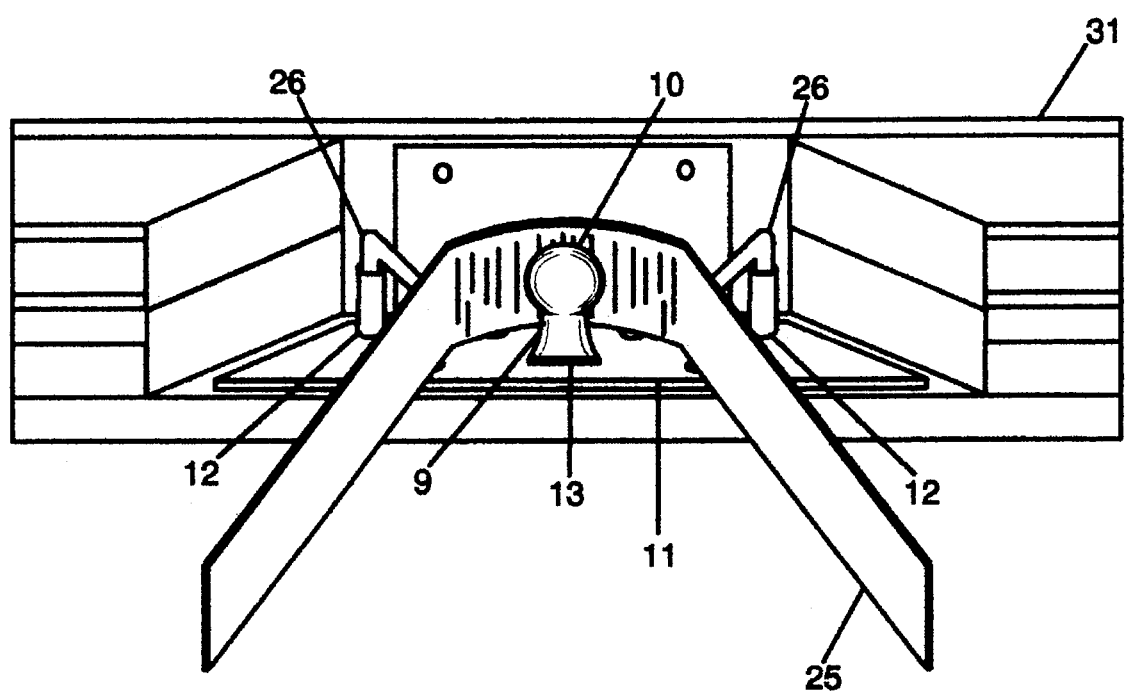
FIG. 5A shows a view of the assembly securely mounted onto a bumper.

FIG. 5A depicts the preferred embodiment mounted on a vehicles bumper 31. The horizontal steel plate 11 is placed on the bumper 31, the hitch ball 10 is then threaded by the shank 9 through the hole 13 on the horizontal steel plate 11 and the pre-existing bumper hole. The hitch ball 10 is tightened by its nut 8 (not shown) as specified by the vehicle manufacturer. No welding or special tools are needed to assemble or remove the Hitch Helper.

Holding onto the ends of the V shaped guide 25, you would then lower it onto the horizontal steel plate 11. The four male dowels 26 on the V shaped guide 25 are then inserted into the four female dowels 12 of the horizontal steel plate 11. The placement of the V shaped guide's 25 male dowels 26 and female dowels 12 are at the rear of the assembly, thus providing a greater clearance of the trailer tongue around the hitch ball 10.

After this assembly is in place, the driver backs the towing vehicle up to the trailer. Once the trailer tongue touches the any part of the V shaped guide 25, it will be guided onto the hitch ball 10 of the bumper 31. The driver will get out of the vehicle, lock the trailer onto the hitch ball 10, remove the V shaped guide 25 and store it until it is needed again. The V shaped guide 25 is removed by simply lifting it off the horizontal steel plate 11, with your hands. The V shaped guide 25 must be removed alter each use.

Figure 6A:
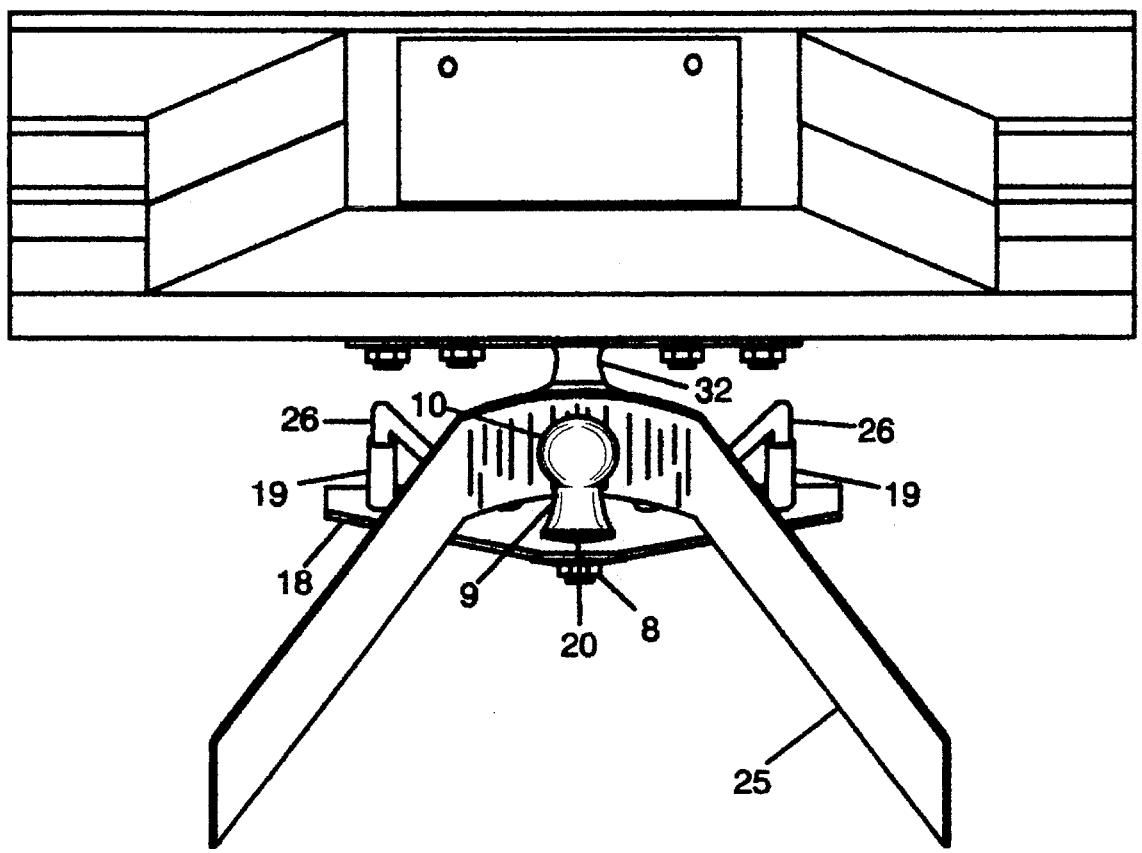
FIG. 6A shows a view of the assembly securely mounted onto a receiver hitch.

FIG. 6A depicts the preferred embodiment mounted on a vehicles receiver hitch 32. The horizontal steel plate 18 is placed on the receiver hitch 32, the hitch ball 10 is then threaded by the shank 9 through the hole 20 on the horizontal steel plate 18, and the existing hole on the receiver hitch 32. The hitch ball 10 is then tightened by its nut 8 as specified by the vehicle manufacturer. No welding or special tools are needed to assemble or remove the Hitch Helper.

Holding onto the ends of the V shaped guide 25, you would then lower it onto the horizontal steel plate 18. The four male dowels 26 on the V shaped guide 25 are then inserted into the four female dowels 19 of the horizontal steel plate 18. The placement of the V shaped guide's 25 male dowels 26 and female dowels 19 are at the rear of the assembly, thus providing a greater clearance of the trailer tongue around the hitch ball 10.

After this assembly is in place, the driver backs the towing vehicle up to the trailer. Once the trailer tongue touches the any part of the V shaped guide 25, it will be guided onto the hitch ball 10 of the receiver hitch 32. The driver will get out of the vehicle, lock the trailer onto the hitch ball 10, remove the V shaped guide 25 and store it until it is needed again. The V shaped guide 25 is removed by simply lifting it off the horizontal steel plate 18 with your hands. The V shaped guide 25 must be removed after each use.

NOTE: The V shaped guide 25 is to be used only for assisting in the actual hook up. The V shaped guide 25 must be removed before towing.

This is what is claimed to be new by this invention:

1. A two part trailer hitch assembly used to assist in guiding a trailer tongue onto a hitch ball of a towing vehicle comprising:

a removable horizontal steel plate having at least one hole for receiving said ball of the towing vehicle for removably securing said plate to said towing vehicle;

said plate having at least two vertically extending female dowels mounted on a rearward portion of the said plate, said female dowels extending upward from said plate;

a horizontally extending removable V shaped guide for aligning said trailer tongue and said ball;

said guide having at least two 90 degree male dowels mounted on a rearward portion of said guide, said dowels having a first portion extending horizontally from said V shaped guide and a second portion extending vertically downward;

wherein said male dowels are removably received in said female dowels for properly positioning V shaped guide with respect to said horizontal plate.

* * * * *